United States Patent
Verghese et al.

(10) Patent No.: US 6,433,885 B1
(45) Date of Patent: *Aug. 13, 2002

(54) METHOD AND APPARATUS FOR MANIPULATING BITMAP RASTER DATA USING A MODULAR PROCESSING PIPELINE

(75) Inventors: Philip C. Verghese; Deborah L. Rivers, both of Boise; William F. Turtle; David L. Smith, both of Meridian, all of ID (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,200

(22) Filed: Nov. 24, 1997

(51) Int. Cl.[7] .............................................. G06K 15/00
(52) U.S. Cl. ...................................... 358/1.15; 707/500
(58) Field of Search ................................. 395/114, 117, 395/110, 109; 358/1.1–1.9, 1.12–1.14, 1.16, 1.17; 709/102, 323, 324–327; 707/500

(56) References Cited

U.S. PATENT DOCUMENTS

| | | | | |
|---|---|---|---|---|
| 5,029,327 A | * | 7/1991 | Nureki | 395/110 |
| 5,303,334 A | * | 4/1994 | Snyder et al. | 395/109 |
| 5,394,523 A | * | 2/1995 | Harris | 345/501 |
| 5,485,246 A | * | 1/1996 | Hayashi et al. | 355/202 |
| 5,515,481 A | * | 5/1996 | Pardo | 395/117 |
| 5,604,843 A | * | 2/1997 | Shaw et al. | 395/114 |
| 5,634,089 A | * | 5/1997 | Kulbida et al. | 395/109 |
| 5,774,638 A | * | 6/1998 | Kageyama et al. | 395/114 |
| 5,796,411 A | * | 8/1998 | Cyman et al. | 345/502 |
| 6,065,058 A | * | 5/2000 | Hailpern et al. | 709/231 |

* cited by examiner

Primary Examiner—Gabriel Garcia
Assistant Examiner—King Y. Poon (57) ABSTRACT

A configurable printer driver, resident on a host (source) computer is enabled to respond to a print job request by manipulating a source bitmap prior to its transmission to a destination printer. The printer driver includes plural, substantially independent, bitmap manipulation procedures which may be linked to provide an image processing pipeline. The method of the invention initially determines which bitmap manipulations should be performed on the source computer, to minimize the quantity of bitmap data to be dispatched to the destination printer or to maximize processing efficiency of the print job request. Based upon the aforesaid determination, a bitmap processor pipeline is assembled from stored bitmap manipulation procedures to perform manipulations of the source bitmap in the source computer. The bitmap manipulations are then performed, using the assembled bitmap processor pipeline. The resulting processed raster bitmap is then transferred to the destination printer.

14 Claims, 5 Drawing Sheets

METHOD AND APPARATUS FOR MANIPULATING BITMAP RASTER DATA USING A MODULAR PROCESSING PIPELINE

FIELD OF THE INVENTION

This invention relates to processing of bitmap raster data on a host processor prior to dispatch to a printer and, more particularly, to a host processor's printer driver which includes individual processing modules whose functions can be selectively turned on or off, in dependence upon processing efficiency decisions.

BACKGROUND OF THE INVENTION

A device driver is a software module whose function is to isolate details of operating the device from both application programs and the operating system on a host computer. In general, when a printer is shipped, a disk or disks accompany a printer and include printer driver code to be installed on the host computer. Such drivers are responsible for converting requests from an application program into a stream of commands that can be understood and executed by the printer.

Printer drivers handle text, vectors and raster images in different ways. Raster images are pixel bitmaps that are defined by describing the color of every pixel in the image. Because of the amount of data needed to describe a raster bitmap, considerable processing time is required to prepare such data for transmission to a connected printer. The degree of processing that a printer driver performs on the raster bitmap data coming from an application program varies, depending upon the capabilities of the printer and the requirements of the user. Examples of operations performed upon a raster bitmap image by a printer driver include the following:

Color/space transformations—wherein red/green/blue values are transformed to black, cyan, magenta and yellow values.

Image processing—wherein contrast correction and color balancing actions are performed.

Bit depth conversion—wherein halftoning and/or other dithering actions are carried out to improve image gray level presentation.

Image rotation—wherein an image is rotated by a given angle.

Scaling—wherein an image is increased in size or decreased in size by, for instance, pixel replication, resolution synthesis or a further scaling algorithm.

Clipping—wherein only a region of an image is to be transmitted to a printer.

Compression—wherein image data is compressed to reduce the amount of required data to be transmitted to the printer.

Depending upon the nature of a print job, each of the above processing actions can occur in the printer driver, the operating system, the printer or not at all.

From a speed of processing point of view, the slowest function carried out by the host computer is transmission of the print data to the printer. Processing actions which occur within the host computer or within the printer occur at a much faster rate than the available data transmission speed between the host computer and the printer. Accordingly, if the amount of the image data that is transmitted to the printer can be minimized, the resulting performance improvements can be substantial.

Historically, the task of processing raster bitmap data in a printer driver has been accomplished using a monolithic, static piece of code. Such printer drivers often combine processing steps for efficiency purposes. For instance, in many current printer drivers, scaling, dithering and compression are performed simultaneously. Thus, modifying any one of these procedures can involve a fairly substantial rewrite of the entire printer driver code. Further, because the features of the driver and printer are determined at design time, the printer driver code is "static". Thus, the driver is written to match the capabilities of a specific device. For instance, assumptions made about the capabilities of the host computer's speed, network bandwidth, etc., become fixed and once the printer driver has been released, these assumptions cannot be changed. As are result, if new image processing procedures become available or hardware improvements are made which potentially improve the efficiency of bitmap processing, the entire raster processing part of a printer driver must be reviewed and, potentially, rewritten to accommodate the improvements. Such a rewrite action is both expensive and time consuming.

Accordingly, it is an object of this invention to provide a printer driver with the capability of ready modification of its raster processing code, without a need for a rewrite of the entire raster code.

It is another object of this invention to provide an improved printer driver procedure with the capability to configure a raster bitmap processing pipeline to maximize processing efficiency of the raster bitmap.

It is yet another object of this invention to provide an improved printer driver that is capable of taking into account performance capabilities of both a host computer and a connected printer, when deciding on an optimum configuration of a processing pipeline to handle raster bitmap images.

SUMMARY OF THE INVENTION

A configurable printer driver, resident on a host (source) computer is enabled to respond to a print job request by manipulating a source bitmap prior to its transmission to a destination printer. The printer driver includes plural, substantially independent, bitmap manipulation procedures which may be linked to provide an image processing pipeline. The method of the invention initially determines which bitmap manipulations should be performed on the source computer, to minimize the quantity of bitmap data to be dispatched to the destination printer or to maximize processing efficiency of the print job request. Based upon the aforesaid determination, a bitmap processor pipeline is assembled from stored bitmap manipulation procedures to perform manipulations of the source bitmap in the source computer. The bitmap manipulations are then performed, using the assembled bitmap processor pipeline. The resulting processed raster bitmap is then transferred to the destination printer.

DETAILED DESCRIPTION OF THE INVENTION

As will hereafter understood, a printer driver incorporating the invention, includes a plurality of object-oriented, modular, software bitmap processing procedures which can be configured into a bitmap processor pipeline. The modular architecture of the printer driver allows the addition of new procedures without the modification of presently existing bitmap procedures. For example, a new image processing procedure can be added by simply creating a new bitmap processing procedure and inserting it into the processor pipeline. Such action does not require modification to the basic architecture of the printer driver nor a rewrite of the remaining processing procedures of the pipeline. Further, by modifying an outlet end of the bitmap processor pipeline, the output raster data can be formatted so that it is compatible with any printer language.

The modular design of the bitmap processing procedures enables dynamic configuration of the bitmap processing pipeline to allow a certain set of bitmap image processing functions to be carried on in the host (source) computer and the remaining image processing functions to be carried out on the printer. Such actions enable the raster processing to be optimized for print speed, image quality, or return-to-application time.

The bitmap processor pipeline also can be modified based upon conditions such as input/output traffic, host processor speed or available host memory. For instance, using scaling as an example, for printers that support scaling, i.e., printing an image on a page whose height or width in pixels differs from the original, the printer driver may decide that the scaling actions are to be carried out on the printer, rather than on the host processor. If, however, scaling on the host processor will reduce the amount of data to be sent to the printer, the printer driver may decide to perform the scaling action on the host processor. Such a decision will be based on information about the speed of the host processor versus the speed of the input/output channel.

Further, the printer driver can also implement a bitmap processing algorithm, based upon a user's selection. Pixel replication is a scaling procedure which scales down an image by dropping pixels and scales up the image by repeating pixels. Such a scaling action will be selected if the user is more concerned with speed than image quality. Resolution synthesis, a more advanced method of scaling that interpolates pixel values, is selected if the user indicates a desire for the best image quality.

The bitmap processor pipeline of the invention is readily adaptable to various types of printers. For instance, the driver can query the printer and then configure the processor pipeline based on the color or halftoning capabilities of the printer.

Figure 1:
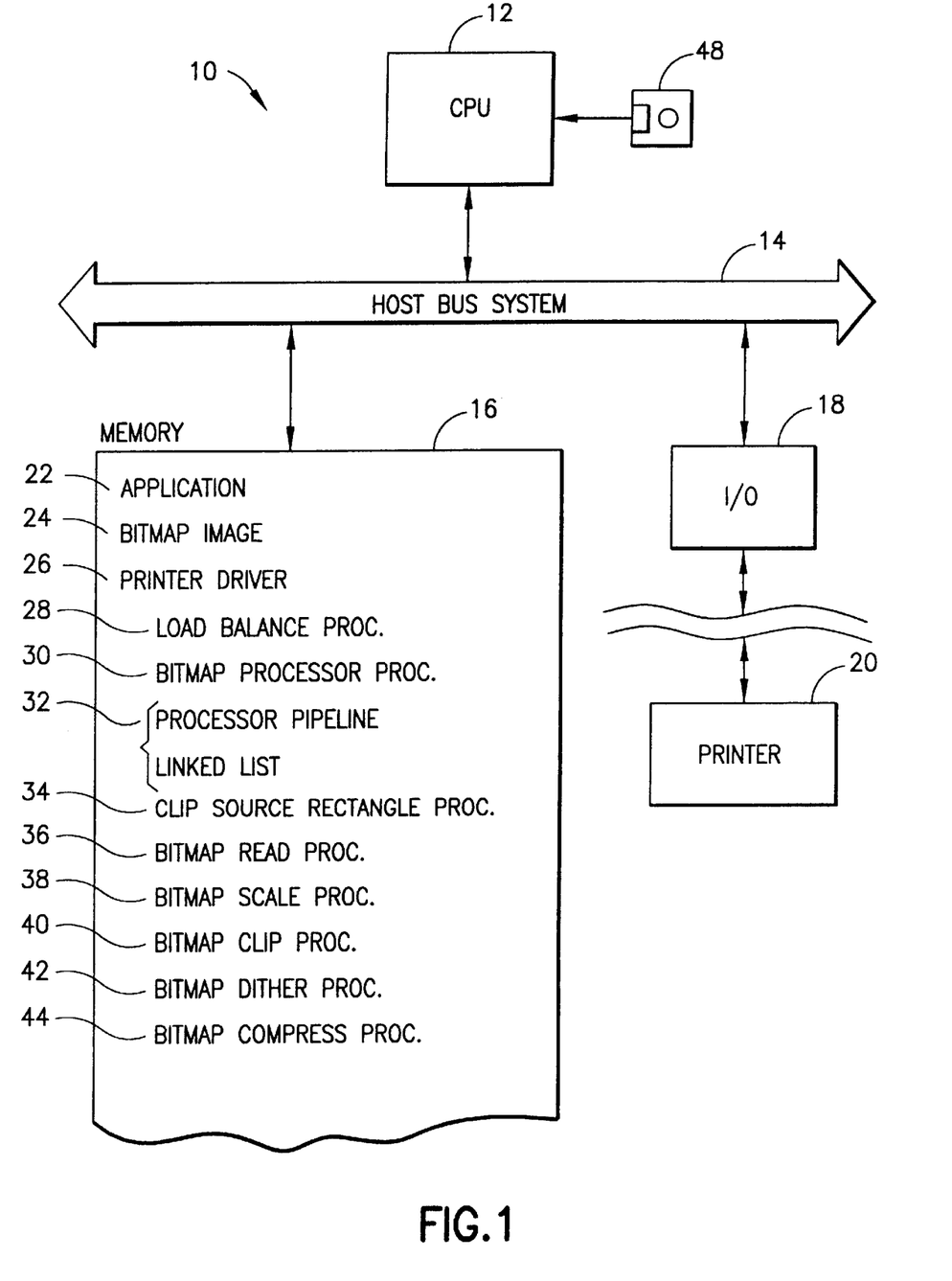
FIG. 1 is a block diagram of a source computer, adapted to carrying out the invention.

Turning now to FIG. 1, host computer 10 includes a central processing unit (CPU) 12 which is coupled via a bus system 14 to both a memory 16 and an input/output (I/O) module 18. I/O module 18 enables communications between host computer 10 and a printer 20. Memory 16 provides storage for both the image data and software procedures utilized by CPU 12 to perform the raster bitmap image processing procedures to be described below. Accordingly, memory 16 includes an application program 22 which is assumed to have generated a bitmap image 24 to be transferred to printer 20. To carry out the transfer, a printer driver procedure 26 incorporates the functions which process bitmap image 24 to ready it for transfer by I/O module 18.

Printer driver procedure 26 includes a load balancing procedure 28 that enables an intelligent decision to be made as to which processing procedures will be incorporated into a bitmap processor pipeline within host computer 10 to process bitmap image 24. A bitmap processor procedure 30 is the control process which configures the bitmap processor pipeline in accordance with the decisions arrived at by load balancing procedure 28. Bitmap processor procedure 30 is able to select from a number of bitmap processing procedures to establish a processor pipeline linked list 32 that configures the bitmap processor pipeline.

Each of the additional procedures stored in memory 16 is a software control element which enables a modification of bitmap image 24 in accordance with user instructions. Those procedures include:

Clip source rectangle procedure 34: To reduce the amount of data that is processed through the pipeline, the clip rectangle is projected into source space and is used to perform a "rough" clip of the source image. An exact clip is not possible until the bitmap is in the destination space.

Bitmap read procedure 36: a procedure which reads succeeding pixel rows from the raster pixel image and provides those rows to a next procedure in the bitmap processor pipeline. This procedure is necessary because of the multitude of bitmap formats.

Bitmap scale procedure 38: This procedure translates the bitmap from the source space to the destination space. It scales a raster bitmap image either up or down so as to cause it to fit in a rectangle established by the destination printer. Typically, the physical size of the image isn't actually changed but, rather, the ratio between the source and destination is the ratio between the screen resolution on the host computer and the printer resolution. Since the printer generally has a higher level of resolution, more pixels are required to fill the printer image.

Bitmap clip procedure 40: operates in destination space and removes any pixels that are outside of the clip region.

Bitmap dither procedure 42: converts the raster bitmap from one color space to a less capable color space. More specifically, the dither procedure processes regions of pixels and converts the pixel values therein to values which manifest improved grey level representations.

Bitmap compression procedure 44: converts a processed raster bitmap into a compressed format for transmission to the printer (e.g., using run length encoding).

Figure 2:
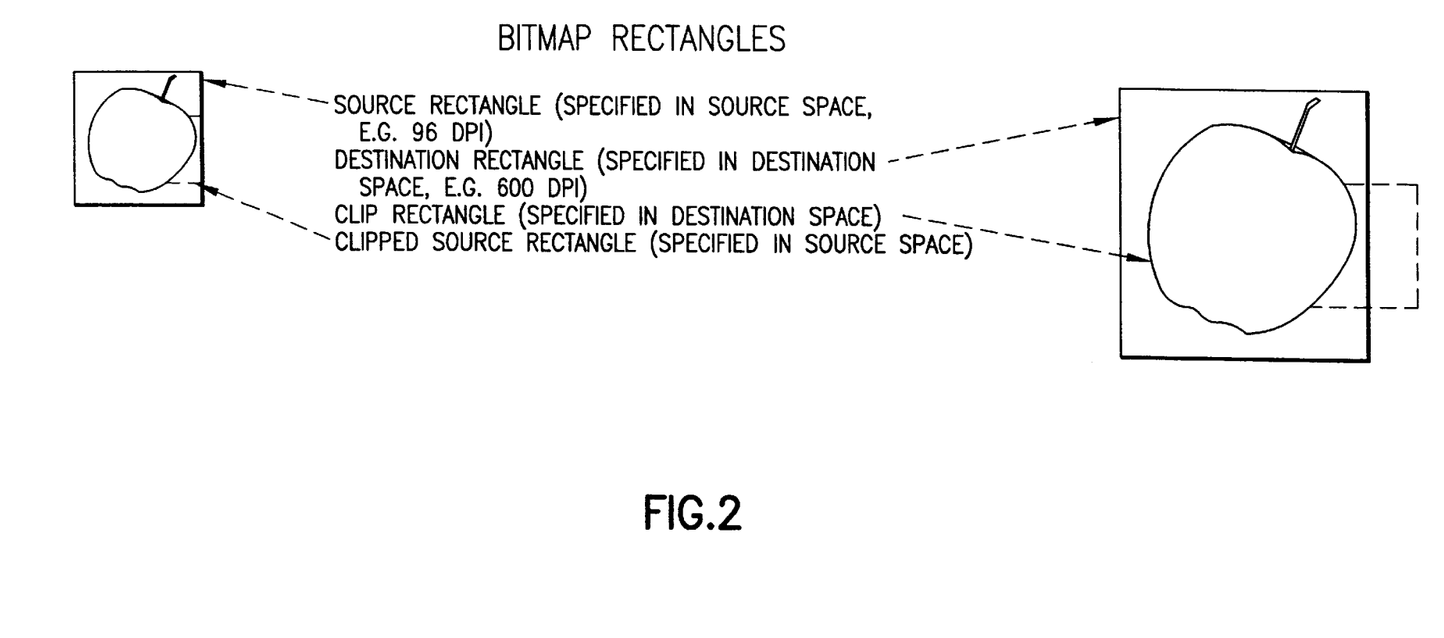
FIG. 2 illustrates the relationship of source and destination rectangles and clip rectangles.

In general, the processing of a raster bitmap commences by the operating system providing the printer driver with a source bitmap, a source rectangle, a destination rectangle and a clip rectangle (see FIG. 2). Thereafter, under control of bitmap processor procedure 30, those pixels which fall within the clipped source rectangle are partitioned for subsequent processing. The clipped source rectangle is the clip rectangle projected into source space, using the ratio between the source and destination rectangles as the scale factor. As illustrated in FIG. 2, source space is the coordinate space of the host computer screen (which usually has a resolution of 96 dots per inch). Destination space is the coordinate space of the printer (which may have a resolution level of 600 dots per inch or higher).

Once the clipped source rectangle partition is calculated by clip source rectangle procedure 34, the pixels of the source bitmap that fall within the clipped source rectangle are read by bitmap read procedure 36, line by line. Those pixels are passed to bitmap scale procedure 38 wherein an appropriate scaling of the bitmap raster image is performed. Next, the scaled bitmap raster data is passed to bitmap clip procedure 40, wherein pixels outside the clip rectangle are removed. Such action is necessary because of rounding errors which occur when the clip rectangle is projected into the source space to make the clipped source rectangle.

Thereafter, the processed raster bitmap data is fed to a dither procedure 42 which performs a required dither action. Then, the dithered raster bitmap data is compressed by compression procedure 44 and is transmitted to printer 20.

It is to be understood that while each of the above-described procedures is shown as already present in memory 16, such procedures can be maintained on removable media such as disk 48 (e.g., a magnetic disk or a compact disk). Under such conditions, the controlling procedures are downloaded from disk 48 into CPU 12 and are utilized to perform the method of the invention.

Figure 3:
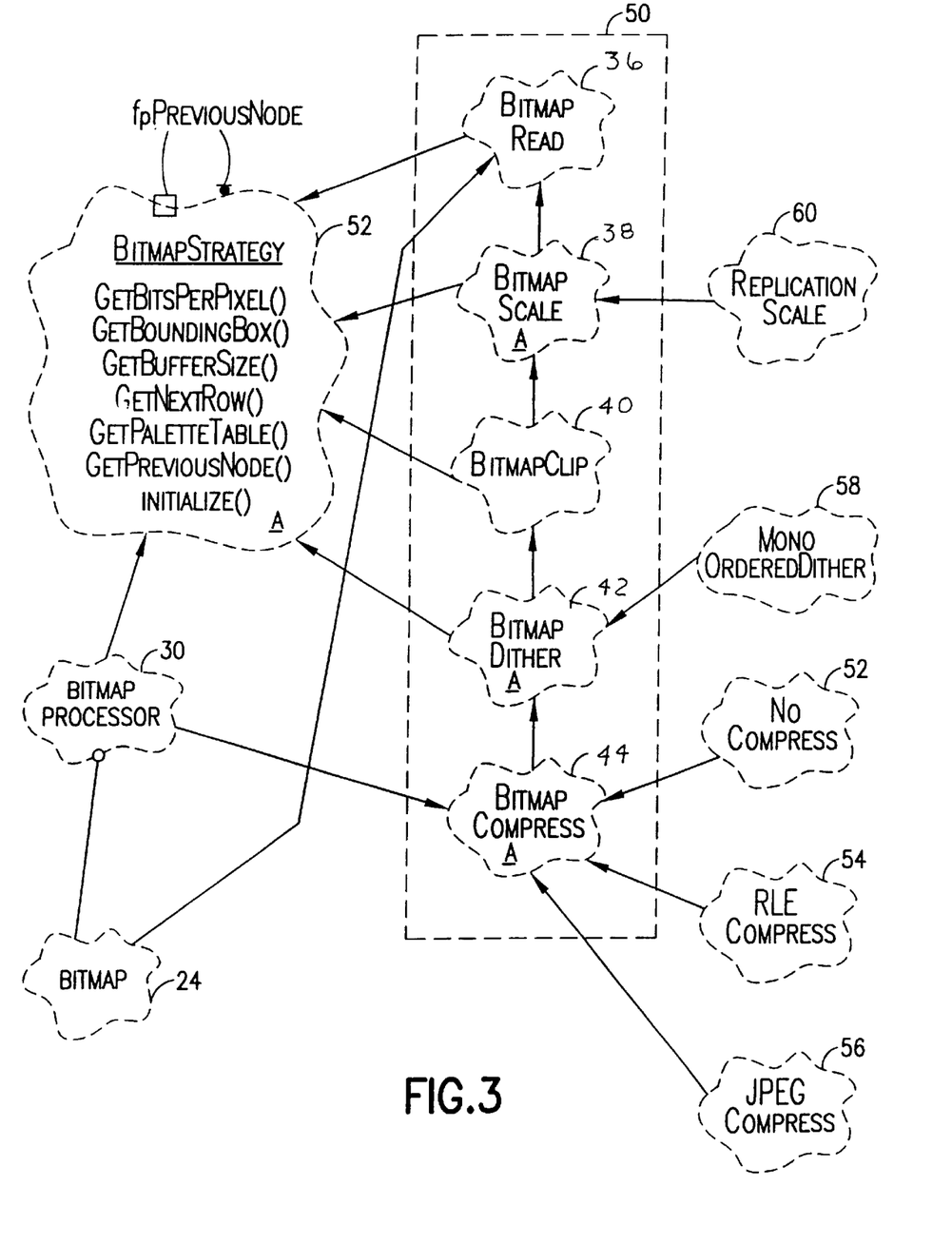
FIG. 3 is a schematic view of software control elements that are employed to configure a bitmap processor pipeline in response to a print job request.

Turning to FIG. 3, further details of the control elements employed by the invention will be described. A software control element, as used hereafter, refers to a software code module which includes an interface, behavior and state (also known as a class in object-oriented programming terminology). Note that FIG. 3 uses the Booch notation as described in "Object-Oriented Analysis and Design", Booch, G., Benjamin/Cummings Publishing, Redwood City, Calif. 1994.

FIG. 3 is a schematic showing of the relationships of the software control elements that are used to configure a bitmap processor pipeline 50. Bitmap processor procedure 30 and the procedures in bitmap processor pipeline 50 inherit certain interfaces from bitmap strategy 52. A common interface specifies the kinds of requests that can be made to a software control element, i.e., an object. More particularly, bitmap processor 30 and each software control element must be able to respond to the following requests: get bits per pixel; get bounding box; get buffer size; get next row; get palette table; get previous node; and initialize.

Each of the requests in bitmap strategy 52 may be dispatched by bitmap processor 30 to bitmap compress procedure 44, which is the last software control element in processor pipeline 50. Each software control element is only able to dispatch a request to its next upstream-positioned software control element. Thus, upon receiving a request from bitmap processor 30, bitmap compress procedure 44 processes the request. While processing the request, it may need to make a request to a next upstream software control element (i.e., bitmap dither procedure 42). Further, bitmap dither procedure 42 may need to make a request in the upstream direction in order to respond, etc.

In essence, this communication protocol implements a "pull" procedure wherein an upstream software control element is only able to respond in the downstream direction with an answer to a received request. However, a downstream software control element can dispatch any of the requests defined by the Bitmap Strategy interface. Accordingly, if each software control element is assured of being able to respond to each of the interface requests designated by bitmap strategy 52, it can be seen that a level of standardization is enabled, as between the software control elements. Further, when a new software control element is substituted or added to processor pipeline 50, it too need only respond to pull requests from a software control element that is positioned further downstream in the processing direction and can dispatch any of the above-mentioned requests to the next upstream element, without having to know the identity of the upstream element.

Each of the software control elements that is marked with an "A" is an "abstract" control element which defines interfaces that a "concrete" control element will implement. For instance, bitmap compress procedure 44 defines what is common to all compression procedures. Concrete compression procedures such as no compress procedure 52, run length encoding compress procedure 54 or JPEG compression procedure 56 can be implemented and inserted into pipeline 50, so long as they all adhere to the class restrictions. In similar manner, bitmap dither procedure 42 defines what is common to all dithering procedures. A concrete dithering procedure is mono-ordered dither procedure 58 or further dither procedures (not shown). Bitmap scale procedure 38 defines what is common to all scaling procedures, such as replication scales 60.

Each of the requests allowed by the interface noted in bitmap strategy control element 52 designates an operation that can be requested to be performed by a software control element in processor pipeline 50. For example, the request "get next row" is passed by bitmap processor 30 to bitmap compress procedure 44. That request is passed upstream through bitmap dither procedure 42, bitmap clip procedure 40, bitmap scale procedure 38 to bitmap read procedure 36. There, bitmap read procedure 36 responds to the request by accessing a next row of pixel data from bitmap 24 and returning the row of bitmap pixel data to bitmap scale procedure 38 which performs a scaling action thereon (in accordance with a setting that is specified during an initialization phase of processor pipeline 50, to be described below).

The scaled row of pixel data is next returned downstream to bitmap clip procedure 40 where a clip action is performed. Then, the row of pixel data is returned to bitmap dither procedure 42 where a required dither procedure (if any) is performed and the row of pixel data is then returned to bitmap compress procedure 44 where it is compressed for transmission to printer 20. During setup of processor pipeline 50, one of compression procedures 52, 54, or 56 is specified and, via bitmap compress procedure 44, is executed.

Figure 4:
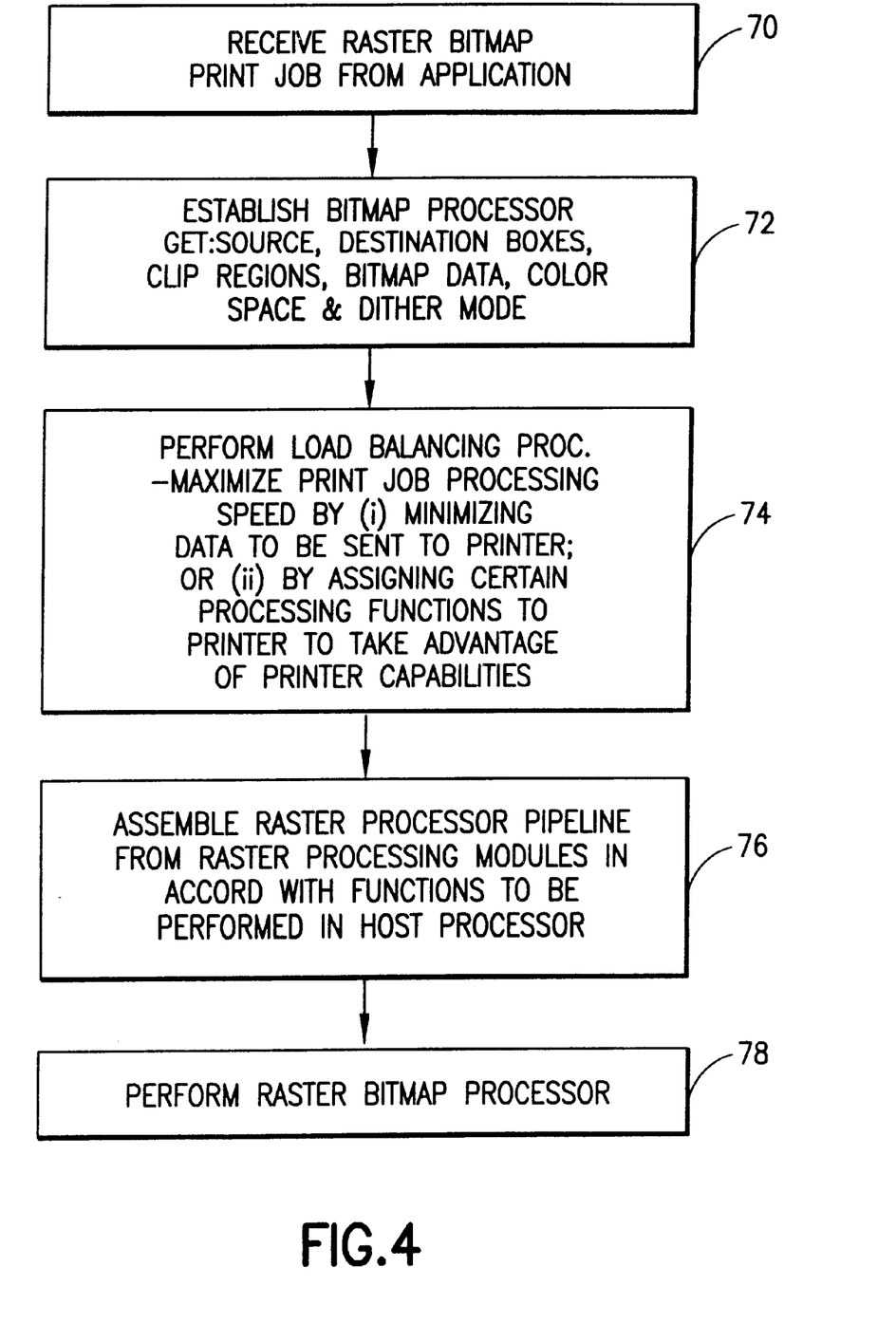
FIG. 4 is a high level logic flow diagram illustrating the operation of bitmap processor pipeline elements in responding to a print job request.

As shown in FIG. 4, to establish processor pipeline 50, the procedure commences with printer driver 26 (FIG. 1) receiving a print job from application 22 (box 70). Printer driver 26 specifies the kind of output desired from processor pipeline 50 and, for instance, defines the type of required compression, sizes of the source and destination boxes, a clip region for the source rectangle (if needed), the color space, a dither mode and a dither matrix, if needed (box 72). The dither mode instructs bitmap processor 30 the type of dithering to perform.

Next, a load balancing procedure is performed (box 74) to enable a configuration of processing pipeline 50 which maximizes the processing speed of the print job. Accordingly, processor pipeline 50 is arranged so as to minimize the amount of data to be sent to the printer, or to take advantage of printer capabilities by assigning certain image processing functions to the printer. For instance, if the printer includes a hardware dither module and the raster bitmap image exceeds a certain size, the load balancing procedure may decide that processing efficiency will be improved by causing the dither procedure to be performed at the printer.

In essence, load balancing procedure 28 determines whether the quantity of raster bitmap data can be reduced enough by scaling, clipping and dithering actions in processor pipeline 50, to reduce the time required to transmit the data to the printer. An example of a procedure for minimizing the quantity of data to be sent to the printer is shown in FIG. 4 and will be described in detail below.

To reiterate, each software control element that is configurable into processor pipeline 50 shares a common input/output interface characteristic. Accordingly, when any software control element is substituted for another software control element or is added to processor pipeline 50, it must merely adhere to the interface methods of all other software control elements. Further, since each of the software control elements operates upon a data "pull" basis, the software control element only needs to be configured to respond to the interface requests shown in bitmap strategy 52. Lastly, while each software control element in processor pipeline 50 can only respond to a received request, it can dispatch any of the interface requests found in bitmap strategy 52 to a software control element which resides further upstream in processor pipeline 50.

Returning to FIG. 4, when bitmap processor 30 has completed load balancing procedure 28, it builds processor pipeline linked list 32 which defines processor pipeline 50. Bitmap processor procedure, using processor pipeline linked list 32, causes an initialize request to be passed, from element to element listed in linked list 32 (box 76). When a software control element receives an initialize request, it knows that all upstream control elements in processor pipeline 50 have been initialized and it may thus initialize itself. If the software control element has work to do in accordance with the results of the load balancing procedure (i.e., is configured as part of processor pipeline 50), the initialize method returns true and the software control element is linked into processor pipeline 50. If not, the initialize method returns false and that software control element is deleted. Processor pipeline 50 is thus built, starting with a selected bitmap compress procedure 44 (i.e., no compress procedure 52, RLE compress procedure 54 or JPEG compress procedure 56) and working up to bitmap read procedure 36.

Once initialization of the software control elements in processor pipeline linked list 32 has been completed, processor pipeline 50 is ready to commence the handling of the raster bitmap 24. Accordingly, bitmap processor 30 issues a "get next row" request to bitmap compress procedure 44 which passes the request upstream. The request reaches bitmap read procedure 36, which responds by accessing a next row from bitmap 24 (box 78) and downstream processing is performed on the row as it reaches each software control element. The procedure continues until all rows have been processed.

Figure 5:
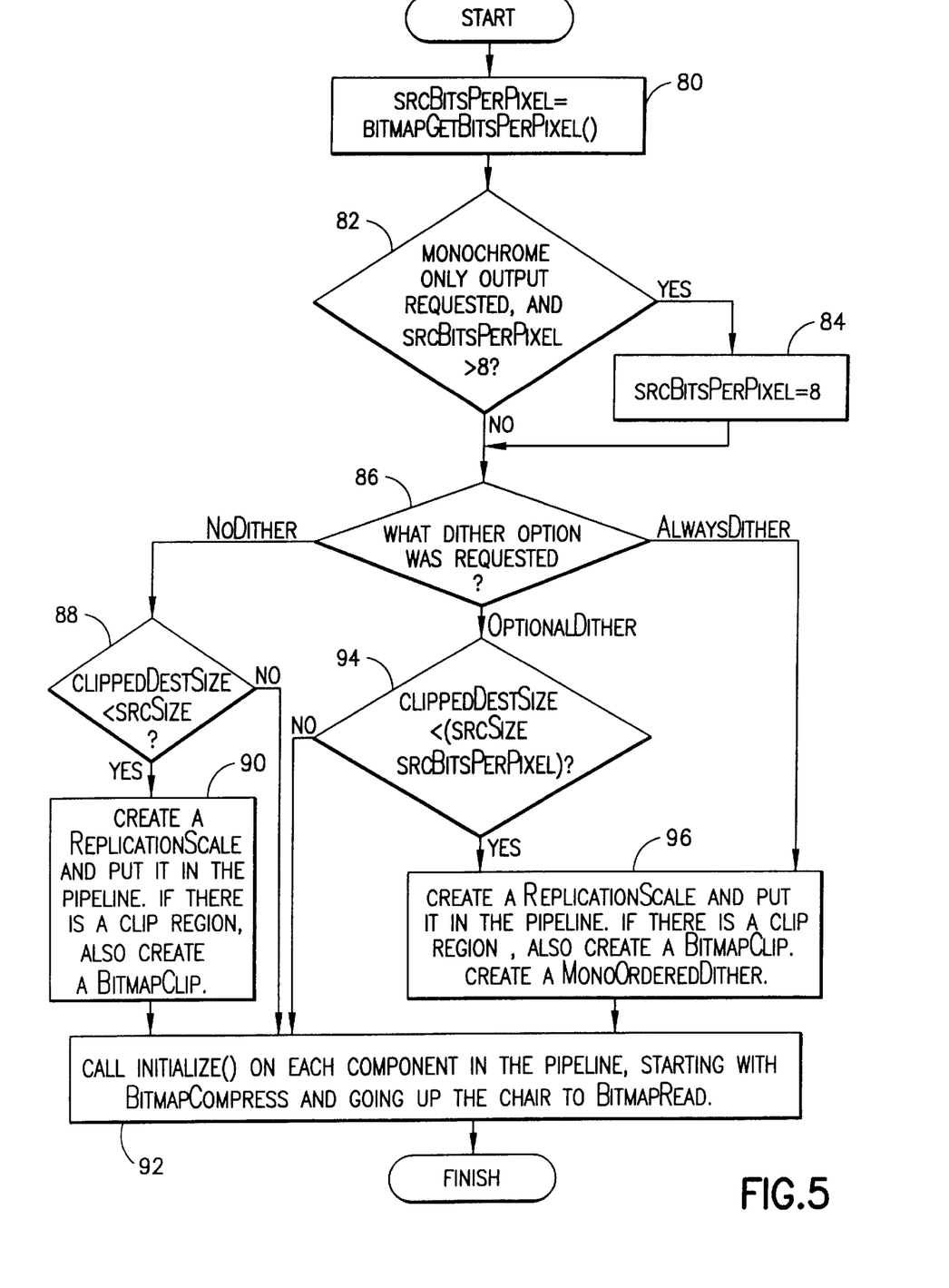
FIG. 5 is a logical flow diagram illustrating the operation of a load balancing procedure which determines which software control elements should be incorporated into the bitmap processor pipeline to minimize an amount of bitmap data to be dispatched to a destination printer.

FIG. 5 illustrates a specific example of load balancing procedure 28 that enables configuration of bitmap processor pipeline 50 in such a manner as to reduce the amount of data to be transmitted to printer 20. As will be hereafter understood, load balancing procedure 28 elects to implement in host computer 10, the various software control elements, unless the allocation of one or more of those control elements to printer 20 will result in less data being sent to the printer and a resultant speed-up of the print job.

Initially, load balancing procedure 28 sets the variable "srcBitsPerPixel" equal to the number of bits per pixel in the bitmap. This value is accessed by dispatching a "GetBitsPerPixel" request to the bitmap (box 80). Thereafter, if the output of processor pipeline 50 is specified to be fed to a monochrome-only printer, and the number of source bits per pixel exceeds 8, then the srcBitsPerPixel variable is set equal to 8 (decision box 82 and box 84). This action is taken because a monochrome-only printer can only reproduce 256 shades of gray, so 8 bits per pixel are adequate. If, by contrast, other than a monochrome printer is being utilized (decision box 82), the procedure moves directly to decision box 86 wherein it is determined what dither option was requested.

Recall, that the object of this procedure is to reduce the amount of data that is transmitted between host computer 10 and printer 20. Accordingly, if no dither is requested, the procedure next determines whether the size of the destination image, after clipping and scaling, is smaller than the size of the source image (decision box 88). If yes, then there is no benefit to be gained by causing printer 20 to perform the processing which arrives at the clipped destination size image. Note that "clippedDestSize" is the area, in destination pixel units, of the clip rectangle intersected with the destination rectangle (see FIG. 2). Further, "srcSize" is the area, in source pixel units, of the source rectangle.

Accordingly, as shown in box 90, an instance of replication scale element 60 (FIG. 3) is created and put in pipeline 50, if needed. Further an instance of bitmap clip is created and put in the pipeline, if needed (box 92).

Returning to decision box 86, if the dither action is optional, then a dither action will only be performed on host computer 10 if the dithered image data that is passed to printer is less than the un-dithered image data. As shown in decision box 94, this is determined by comparing the destination size image, after clipping, with the source size image multiplied by the number of source bits per pixel. In general, a destination size clipped image, after dithering, will exhibit one bit per pixel. Thus, if the number of bits (at one-bit per pixel) in the dithered destination size image is less than the number of bits in the source pixel image, then it is worthwhile to perform scaling, clipping and dithering actions in processor pipeline 50 on host processor 10 (see box 96). If, by contrast, the dithered, clipped destination size image is greater than the number of bits in the source image, then rather than increasing the amount of data that must be transmitted, the bitmap is sent as-is for the printer to process.

Finally, if the dither option (decision box 86) is to always dither, then scaling and dithering are performed in processor pipeline 50 (box 96). This is so because, the client code requests this, even though it may increase the amount of data. Clients make this request if they need to manipulate device-ready bitmaps. Note that a "client" is another part of the printer driver that needs to process a bitmap, for example, the part that interfaces with the operating system It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enabling a configurable printer driver resident on a source computer to respond to a print job request by manipulating a source bitmap prior by transmission to a destination printer, said printer driver comprising plural, substantially independent, source computer bitmap manipulation procedures, said method comprising the steps of:

determining a set of source computer bitmap manipulation procedures selected from said substantially independent, bitmap manipulation procedures to perform on said source computer to maximize processing efficiency of said print job request;

assembling a bitmap processor pipeline from said determined set of source computer bitmap manipulation procedures to perform source computer bitmap manipulations on said source bitmap, said determined set of source computer bitmap manipulation procedures arranged in a required bitmap processing order that proceeds from upstream to downstream, so that when a bitmap segment proceeds through said bitmap processor pipeline, all bitmap processing actions are performed in a prescribed order, and wherein any bitmap manipulation procedure in said bitmap processor pipeline is only enabled to respond to a pull request to perform a requested bitmap processing action that is initiated by a bitmap manipulation procedure located downstream therefrom and is further enabled to initiate a pull request to a bitmap manipulation procedure that is located upstream therefrom; and performing bitmap manipulations using said assembled bitmap processor pipeline.

2. The method as recited in claim 1, wherein said processing efficiency of said print job request is maximized by minimizing an amount of bitmap data to be dispatched to said destination printer.

3. The method as recited in claim 1, wherein each bitmap manipulation procedure that comprises a part of the assembled bitmap processor pipeline is enabled to respond to each of a set of common plural requests that are dispatched up said bitmap processor pipeline.

4. The method as recited in claim 1, wherein said printer driver includes a bitmap processor procedure for controlling operations of said bitmap processor pipeline, and said bitmap processor pipeline commences with an input bitmap read procedure, ends with an output source computer bitmap manipulation procedure and includes at least an intermediate source computer bitmap manipulation procedure, and requests received from said bitmap processor procedure during performing bitmap manipulation using said assembled bitmap processor pipeline are only dispatched from said output source computer bitmap manipulation procedure to said input bitmap read procedure through any intermediate source computer bitmap manipulation procedures resident therebetween.

5. The method as recited in claim 1, wherein said source computer bitmap manipulation procedures at least comprise: a bitmap read procedure, a bitmap scale procedure, a bitmap clip procedure, a bitmap dither procedure and a bitmap compress procedure.

6. The method as recited in claim 1, wherein said source computer bitmap manipulation procedures include common interfaces with said printer driver so as to enable an interfacing of further source computer bitmap manipulation procedures, without a requirement to modify other source computer bitmap manipulation procedures.

7. The method as recited in claim 1, wherein said determining is based at least upon image characteristics of said source bitmap and characteristics of a corresponding image to be produced by said destination printer maximized by minimizing an amount of bitmap data to be dispatched to said destination printer.

8. A memory media including a configurable printer driver for controlling a source computer to respond to a print job request by manipulating a source bitmap prior to transmission to a destination printer, said printer driver comprising plural, substantially independent, source computer bitmap manipulation procedures, said memory media comprising:

means for controlling said source computer to determine a set of source computer bitmap manipulation procedures selected from said substantially independent, bitmap manipulation procedures to perform to maximize processing efficiency of said print job request;

means for controlling said source computer to assemble a bitmap processor pipeline from said determined set of source computer bitmap manipulation procedures to perform source computer bitmap manipulations on said source bitmap, said determined set of source computer bitmap manipulation procedures arranged in a required bitmap processing order that proceeds from upstream to downstream, so that when a bitmap segment proceeds through said bitmap processor pipeline, all bitmap processing actions are performed in a prescribed order, and wherein any bitmap manipulation procedure in said bitmap processor pipeline is only enabled to respond to a pull request to perform a requested bitmap processing action that is initiated by a bitmap manipulation procedure located downstream therefrom and is further enabled to initiate a pull request to a bitmap manipulation procedure that is located upstream therefrom; and means for controlling said source computer to perform bitmap manipulations using said assembled bitmap processor pipeline.

9. The memory media as recited in claim 8, wherein said processing efficiency of said print job request is maximized by minimizing an amount of bitmap data to be dispatched to said destination printer.

10. The memory media as recited in claim 8, wherein each bitmap manipulation procedure that comprises a part of the bitmap processor pipeline assembled by means for controlling said source computer to assemble a bit map processor pipeline is enabled to respond to each of a set of plural common requests that are dispatched up said bitmap processor pipeline.

11. The memory media as recited in claim 8, wherein said printer driver includes a bitmap processor procedure for controlling operations of said bitmap processor pipeline, and said bitmap processor pipeline commences with an input bitmap read procedure, ends with an output source computer bitmap manipulation procedure and includes at least an intermediate source computer bitmap manipulation procedure, and requests received from said bitmap processor procedure during controlling said source computer to perform bitmap manipulations using said assembled bitmap processor pipeline are only dispatched from said output source computer bitmap manipulation procedure to said input bitmap read procedure through any intermediate source computer bitmap manipulation procedures resident therebetween.

12. The memory media as recited in claim 8, wherein said source computer bitmap manipulation procedures at least comprise: a bitmap read procedure, a bitmap scale procedure, a bitmap clip procedure, a bitmap dither procedure and a bitmap compress procedure.

13. The memory media as recited in claim 8, wherein said source computer bitmap manipulation procedures include common interfaces with said printer driver so as to enable an interfacing of further source computer bitmap manipulation procedures, without a requirement to modify other source computer bitmap manipulation procedures.

14. The memory media as recited in claim 8, wherein said determining is based at least upon image characteristics of said source bitmap and characteristics of a corresponding image to be produced by said destination printer.

* * * * *

UNITED STATES PATENT AND TRADEMARK OFFICE
CERTIFICATE OF CORRECTION

PATENT NO. : 6,433,885 B1  Page 1 of 1
DATED : August 13, 2002
INVENTOR(S) : Verghese et al.

It is certified that error appears in the above-identified patent and that said Letters Patent is hereby corrected as shown below:

Column 2,
Line 15, "As are result" should read -- As a result --;

Column 3,
Line 9, "hereafter understood" should read -- hereafter be understood --;

Column 9,
Lines 57-60, "source bitmap and characteristics of a corresponding image to be produced by said destination printer maximized by minimizing an amount of bitmap data to be dispatched to said destination printer." should read -- source bitmap and characteristics of a corresponding image to be produced by said destination printer. --.

Signed and Sealed this

Twenty-fourth Day of August, 2004

JON W. DUDAS
*Director of the United States Patent and Trademark Office*